Jan. 8, 1935.  W. G. MICHAELIS  1,987,486
LEAK DETECTOR
Filed April 3, 1933
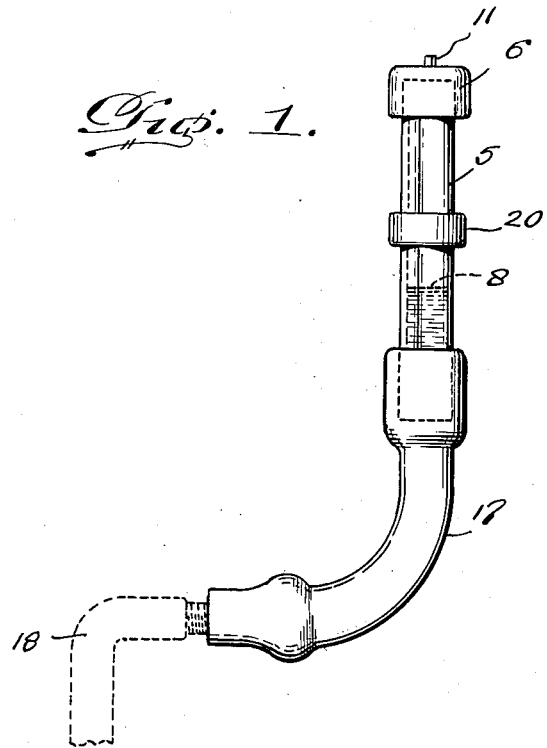
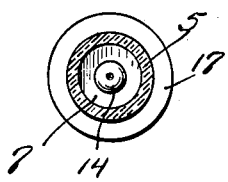
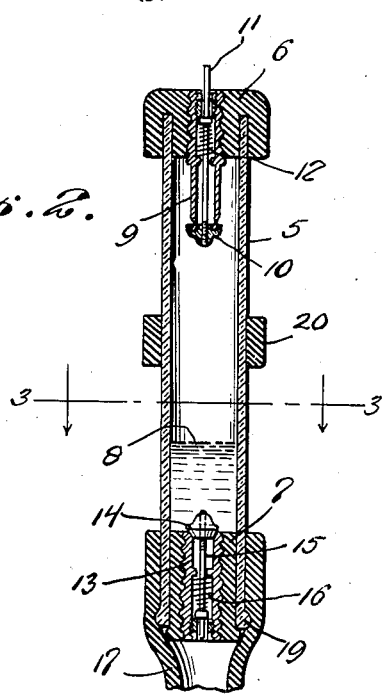
Wilbert G. Michaelis,
INVENTOR.
BY J. Stanley Burch
ATTORNEY.

Patented Jan. 8, 1935

1,987,486

UNITED STATES PATENT OFFICE 1,987,486

LEAK DETECTOR

Wilbert G. Michaelis, Morton, Minn.

Application April 3, 1933, Serial No. 664,244

1 Claim. (Cl. 73—51)

This invention relates to improvements in leak detectors, and has more particular reference to improvements in devices for detecting leaks in inflation valves of pneumatic vehicle tires.

The primary object of the present invention is to generally improve upon the type of inflation valve leak detector consisting in a simple small device which may be readily carried in the pocket or as a part of the equipment of a motor vehicle, and in which the upward passage of air through a body of liquid indicates the existence of a leak in the valve being tested.

A more specific object of the invention is to provide a leak detector of the above type which is extremely simple and durable in construction, efficient in operation, and economical to manufacture.

The invention consists in the novel form, combination and arrangement of parts hereinafter more fully described, shown in the accompanying drawing and claimed.

In the drawing:—

Figure 1 is a side elevational view of a leak detector embodying the present invention and shown applied to the stem of the inflation valve of a pneumatic vehicle tire.

Figure 2 is an enlarged fragmentary vertical section of the leak detector; and

Figure 3 is a transverse section on line 3—3 of Figure 2.

Referring more in detail to the drawing, the present leak detector includes a tube or cylinder 5 of glass or other suitable transparent material closed at the top by a valved combined plug and cap 6 and at the bottom by a valved plug 7 so as to provide a chamber that contains a relatively small body of liquid 8, such as oil. The combined plug and cap 6 and the plug 7 are preferably molded from resilient material, such as fiber, rubber composition or the like. The plug and cap 6 has a central opening in which is molded the upper end of the casing 9 of a check valve controlling communication between the oil chamber and the atmosphere and normally cutting off such communication. This check valve further includes a movable valve member 10 arranged to seat upwardly against the lower end of the casing 9 and carried by a stem that extends through said casing 9 and projects upwardly or outwardly beyond the combined plug and cap 6. A spring 12 encircles the stem 11 and acts to normally yieldingly seat the valve member 10 against the lower end of casing 9, and it will be seen that the projecting upper end of stem 11 may be readily pressed by the finger for manually unseating the valve member 10 when desired.

The plug 7 has an axial or central passage in which is molded the casing 13 of a second spring seated check valve including a movable valve member 14 arranged to seat downwardly against the upper end of casing 13. The valve member 14 is carried by a stem 15 that extends through casing 13 and is encircled by a spring 16 acting to normally seat the movable valve member 14 against the upper end of casing 13.

It will be noted that the check valves are normally closed to prevent escape of the liquid or oil from the chamber provided by tube 5 and the combined plug and cap 6 and plug 7, said check valves being positive in operation for this purpose. Fitted over the lower end of tube or cylinder 5 is one end of a short flexible and elastic conduit or hose section 17 adapted to have its other end readily detachably applied over the end of a tire inflation valve 18 as shown in Figure 1. The lower end of the tube or cylinder 5 is provided with an annular external bead 19 serving to retain the adjacent end of conduit or hose section 17 on the lower end of said cylinder or tube 5 under ordinary conditions of use, the adjacent end of conduit 17 being distended or stretched to fit over the lower end of tube or cylinder 5 as indicated in Figures 1 and 2. In order to protect the tube or cylinder 5 against breakage, a resilient band 20 is fitted thereon intermediate its ends as shown.

The valve stem 18 is the usual valve stem found on the inner tubes of pneumatic vehicle tires and which project through the rim and felly of the wheel to receive a hose connection whereby the tire may be inflated to a proper pressure. These stems 18 contain what are known as "valve insides", and very often these "valve insides" become worn or are defective in some way so as to become leaky, thereby allowing the air pressure to escape from the tire so that the latter becomes deflated. The present invention is adapted to detect leaks of inflation valves due to defective "valve insides", whereby such objectionable deflation of vehicle tires may be avoided to a great extent through proper exercise of care or in view of systematic testing of the inflation valves from time to time.

In use, the lower end of conduit or hose section 17 is slipped over the end of inflation valve 18 as shown in Figure 1 so as to afford an airtight connection of the oil or liquid chamber of the leak detector with the inflation valves. If the "valve insides" of the inflation valve are defective so as to permit the outward escape of air, such air will pass through conduit 17 and act upon valve member 14 so as to unseat the latter. The air will then rise through the body of liquid 8 in the form of bubbles, thereby indicating the leaky condition of the inflation valve 18. It will be understood, however, that after the conduit 17 is applied to the stem of inflation valve 18, the stem 11 of the upper check valve is depressed so as to unseat the valve member 10 and permit the escape of air from the liquid chamber of the leak detector to the atmosphere during the testing operation. Should the detector show a leaky condition of the inflation valve, the insides thereof may be readily removed and renewed in time to prevent deflation of the vehicle tire under adverse circumstances. On the other hand, should no bubbles be shown to rise through the liquid 8, the operator will know that the inflation valve does not leak and that its insides do not require renewal.

It will be noted that the body of liquid 8 is considerable below the lower end of check valve casing 9 in use of the leak detector. As the air will flow slowly from a leaky inflation valve, no danger of the air forcing the liquid out of the chamber is presented, and the air will simply rise through the body of liquid into the upper end of the liquid chamber and then pass slowly to the atmosphere through the check valve of the combined closure plug and cap 6.

It will be seen that the present invention is extremely simple and durable in construction, efficient in use and economical to manufacture. Also, the device may be made in such small size as to be conveniently carried in the pocket or as a part of the equipment of an automobile for instant use when required. Minor changes in the details of construction illustrated and described are contemplated within the scope of the invention as claimed.

What I claim as new is:

A leak detector for tire inflation valves comprising a transparent tube, molded closure plugs fitted within the top and bottom ends of said tube, a relatively small body of liquid within said tube, said plugs having central openings, spring seated check valves having casings molded in the central openings of said plugs and normally seated to prevent escape of the body of liquid from said tube, and means for connecting the lower end of said tube with an inflation valve, the check valve carried by the bottom closure plug being arranged to be unseated by air under pressure from the inflation valve to admit the air into said tube, the check valve carried by the top closure plug including a movable valve member having a stem projecting upwardly to a point exteriorly of the tube and operable for manual unseating of said movable valve member to permit escape of air from said tube to the atmosphere.

WILBERT G. MICHAELIS.